United States Patent [19]
Gallottini

[11] 4,265,764
[45] May 5, 1981

[54] ROTARY DRUM VACUUM FILTER

[75] Inventor: Emilio Gallottini, Lodi, Italy

[73] Assignee: Esmil B.V., Amersfoort, Netherlands

[21] Appl. No.: 34,931

[22] Filed: May 1, 1979

[30] Foreign Application Priority Data

May 3, 1978 [NL] Netherlands ............... 7804735

[51] Int. Cl.³ ............................................ B01D 33/04
[52] U.S. Cl. ..................... 210/390; 210/393; 210/406; 210/411
[58] Field of Search ............ 210/136, 390, 391, 392, 210/393, 398, 404, 406, 407, 408, 411

[56] References Cited

U.S. PATENT DOCUMENTS

| Re. 22,646 | 5/1945 | Kiersted, Jr. | 210/199 |
|---|---|---|---|
| 2,548,999 | 4/1951 | Oliver | 210/404 |
| 2,713,022 | 7/1955 | Dole et al. | 210/393 |
| 3,220,554 | 11/1965 | Burchert et al. | 210/217 |
| 3,302,790 | 2/1967 | Hasten | 210/136 |
| 3,374,889 | 3/1968 | Wallace | 210/391 |
| 3,674,147 | 7/1972 | Danti | 210/136 |
| 4,032,442 | 6/1977 | Peterson | 210/408 |
| 4,139,469 | 2/1979 | Rainin | 210/136 |

FOREIGN PATENT DOCUMENTS

| 608359 | 1/1935 | Fed. Rep. of Germany . |
|---|---|---|
| 715251 | 9/1954 | United Kingdom . |

*Primary Examiner*—Theodore A. Granger
*Attorney, Agent, or Firm*—Stevens, Davis, Miller & Mosher

[57] ABSTRACT

In a rotary drum vacuum filter, the drum sectors are connected by conduits to apertures in a rotary valve member on the drum which is opposed to a fixed valve member. The valve members thus control supply of vacuum (to cause suction filtering) and pressurized gas (to blow the cake of filtered material from the filter) to the drum sectors as the drum rotates. In order to eliminate the time delay between suction and blowing which is needed in order to allow the conduits to purge, another group of conduits is provided, having one-way valves adjacent their connection to the drum surface; this group is used only for blowing. The different groups of conduits are connected to apertures of the rotary valve member at different radial distances from the axis of rotation.

7 Claims, 7 Drawing Figures

ROTARY DRUM VACUUM FILTER

BACKGROUND OF THE INVENTION

1. Field of the Invention

The invention relates to a rotary drum vacuum filter. Particularly but not exclusively, the invention relates to the special application of such a vacuum filter for the removal by filtration of paraffin components from a mixture of mineral oil and its solvent; the invention is not restricted to this application.

2. Description of the Prior Art

In this special application, wax-like or paraffinic components are removed from for instance lubricant by temporarily diluting the mixture with a solvent, such as methyl-ethyl ketone or dimethyl ketone, in which the mineral oil dissolves and the wax components do not dissolve. On subsequent cooling of the mixture to a temperature between $-10°$ C. and $-30°$ C. the paraffin will crystallize out and can then be filtered off. For this purpose there is used a rotary drum, the wall of which is divided into sectors. Pipes connect the sectors to apertures in a rotary valve member which is opposed to a fixed valve member. The valve members cooperate, when the drum rotates, to control the supply of vacuum and pressurized gas via the pipes to the filtration sectors, in accordance with a predetermined programme. The vacuum causes suction filtering while the sector is immersed, and the pressurized gas loosens and dislodges the cake formed on the filter during filtering.

Usually the filter cake on the filter is washed even further with a solvent and is dried. At the end of each revolution of the drum, the cake is removed from the filter by first applying the pressurized gas under the cake and then moving the filter past a scraper. Typically, the drum wall is covered with a grid, over which a filter cloth is stretched.

Often two sets of pipes are used for each sector, which set being connected to a separate aperture in the rotary valve plate. One such set of pipes is connected into the drum wall near the rotationally leading edge of the sector, while the pipes of the other set emerge near the rotationally trailing part of the sector. The "front" or leading pipes provide that the sector is in an open connection with the vacuum source and with the atmosphere outside the drum as soon as the filter surface of the sector emerges from the liquid, while the "back" or trailing pipes provide that the sector remains up to the very last moment in open connection with the atmosphere when the drum plunges back again into the liquid. Also with this arrangement, liquid can collect in each sector and be drained away through whichever pipe is lower of the two.

A short period of time must elapse between the end of suction through the pipes until blowing commences, during which time the pipes can purge. Otherwise, liquid left in the pipes, which may still contain some oil, might be blown back into the filter cake.

In an attempt to increase production per vacuum filter, these filters tend to be driven faster and to acquire a larger drum length. This results in more liquid having to run out along longer lengths of pipe. An inevitable consequence, which has hitherto invariably been encountered, has been that the transition period from suction to blowing had to extend over an ever-increasing angle of rotation of the drum. The production loss on account of this increase in the angle of rotation from 3° to 17° required for purging, in its turn implies a considerable restriction of the production capacity of the filter.

U.S. Pat. No. 3,220,554 and U.S. Pat. No. Re. 22646 show rotary drum filters as described above, with two groups of pipes leading from the drum surface to a rotary valve member having an axial face opposed to an axial face of the fixed valve member. The apertures in the rotary valve member corresponding to the two groups are at different radii. British Pat. No. 715,251 also shows two groups of pipes, but these lead to opposite ends of the drum.

SUMMARY OF THE INVENTION

One object of the invention is to avoid the loss of production in rotary drum filters arising from the need to have a purge time between suction and blowing.

Another object is to provide a rotary drum vacuum filter of improved design and construction.

The invention consists in a rotary drum vacuum filter wherein the drum wall, which carries the filter material, is divided into a plurality of longitudinally extending sectors, and each sector is connected separately from the other sector, by conduits to apertures in a rotary valve plate carried by the drum and axially opposed to a fixed valve member also having apertures, whereby on rotation of the drum the valve plates cause switching of the connection of the conduits, e.g. to a vacuum source or to a source of pressurized gas, according to a predetermined programme, the conduits being arranged in at least two groups with the respective groups of apertures corresponding to the respective groups of conduits located at respective different radial distances from the axis of rotation of the drum, the conduits of a first one of said groups of conduits are each provided with a one-way valve adjacent their connection to the drum.

In this manner it is achieved that the conduits of the said first group may only be used to blow material off the filter, while ensuring that no liquid can penetrate into these conduits. Because of the presence of the one-way valves, these conduits are shut off if nothing is being blown through them. The angle of rotation of the drum required for purging the pipes has thus been reduced to 0°, so that not only in existing designs of vacuum filters can a gain in production be achieved, but it is also possible to increase the speed of the drum as well as its length without any production restriction of output arising from purging of the conduits. By making the apertures in the rotary valve member which correspond with the different groups of conduits at different radii, these apertures can be connected independently of each other to the pressurized gas or vacuum sources, so that faster fluid transport to and from the filter is possible.

Since the conduits of the first group serve only for blowing against the filter cake, it is preferred according to the invention that the apertures at the rotary valve member corresponding to the other group or groups of conduits are connected either to the vacuum source or are shut off. Change-over from suction to blowing is avoided, which can again result in a saving of time and consequently an increase of production.

In order to be able further to reduce the angle of rotation required for the blowing step, it is also preferred according to the invention that the apertures in the valve member and/or the apertures in the valve member associated with the conduits having the one-way valves have a slot shape elongate in the radial direction. In this way it is achieved that these conduits are quickly connected to the full supply of pressurized gas and can also be shut off from it quickly. Blowing of the filter cake is consequently more effectively done, this making it possible to utilize a smaller angle of rotation of the drum for this blowing. In addition this slot-shape also makes it possible to vary the moment at which blowing starts or ends, as well as the duration of blowing, if these slot-shaped apertures are adjustable as to location and/or width.

Various known constructions of one-way valves are suitable for use in the invention. Preferably however, these one-way valves are provided with a slack locking spring. It is also preferred that the conduits having the one-way valves are each, when not connected to the pressurized gas source, connected to the vacuum source. In this manner it can be achieved that, during the period of time that the one-way valves must be closed, a closing force is supplied by the vacuum. The locking spring which consequently can be slack in the closed position, will be less of an impediment to the opening of the valve by the pressurized gas during the blowing period. To simplify the job of fitting the one-way valve, and at the same time to simplify its maintenance, this valve is preferably removable and insertable as a unit from the outside of the drum.

As has already been mentioned the invention is not restricted to the application of removal of paraffin components from a mixture of mineral oil and its solvent. This method does however form one of the chief applications of the filter described above, which in this case preferably is of a cooled apparatus and is enclosed by a casing.

BRIEF DESCRIPTION OF THE DRAWINGS

The preferred embodiment of the invention, and a modification thereof, will now be described by way of non-limitative example and with reference to the accompanying drawings, in which.

DESCRIPTION OF THE PREFERRED EMBODIMENT

Figure 1:
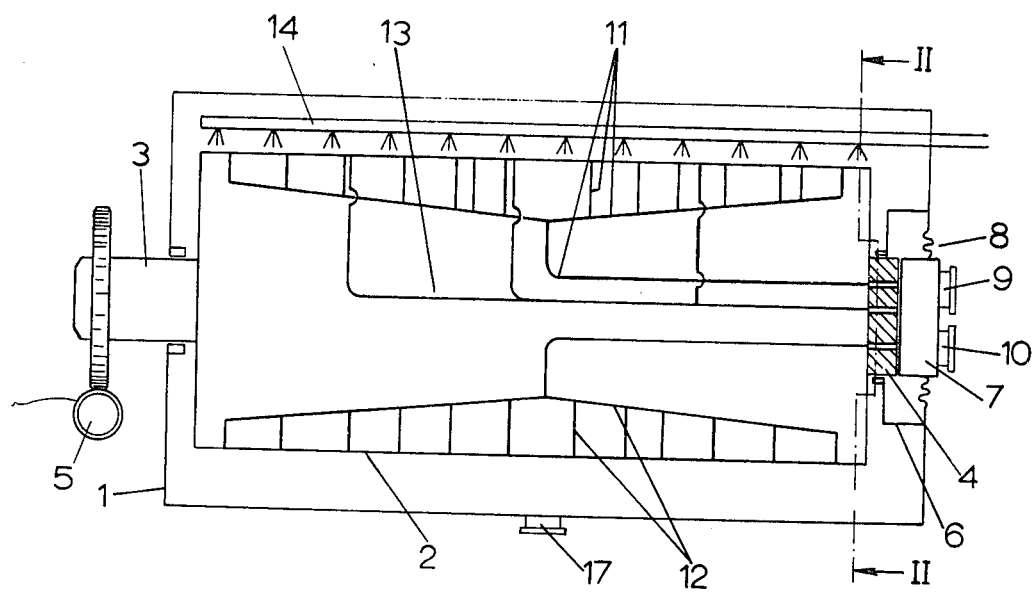
FIG. 1 is a schematic longitudinal (axial) section of the filter embodying the invention.
Figure 2:
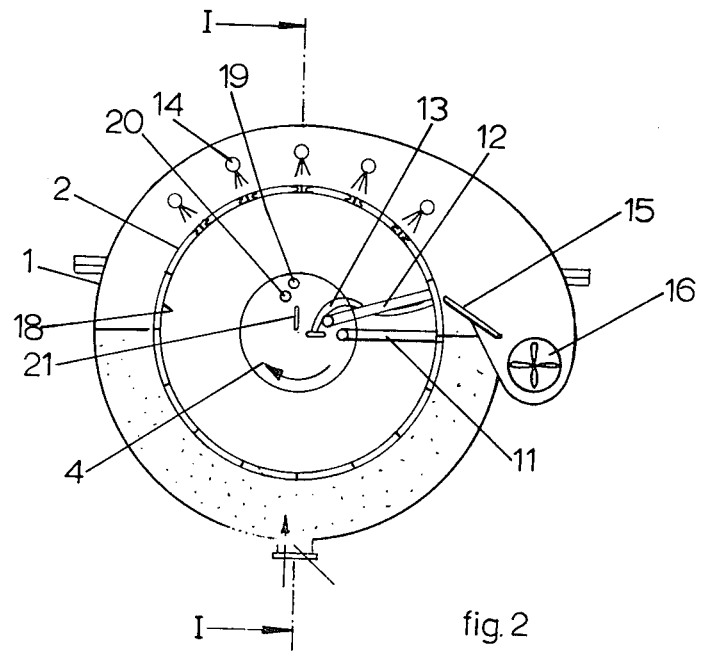
FIG. 2 is a cross-section on the line II—II of FIG. 1.

As FIG. 1 shows, the vacuum filter has a casing 1 around its drum 2. FIG. 2 shows that this casing 1 consists of a lower tank part and a hood, fixed to one another by flanges. The drum 2 has a trunnion 3 supported in a bearing at one end of the casing 1 and a trunnion 4 supported in a bearing 6 which is also mounted on the casing 1. The trunnion 3 and with it the drum 2 are set in rotation by means of a worm 5 and a cooperating worm wheel.

The trunnion 4 in fact constitutes a rotary valve member or pipe plate which has an axial face opposite an axial face of a fixed valve body 7. The fixed valve body 7 is mounted on the casing 1 by a bellows mechanism 8, so that it is possible to maintain the valve body 7 pressed against the trunnion 4, (means to achieve this pressure are of a conventional construction, which for this reason is not shown in more detail in the Figure). The valve body 7 is provided with a connection 9 for vacuum and a connection 10 for pressurized gas.

FIG. 2 shows that the drum 2 is divided into a plurality of longitudinally (axially) extending sectors which are separated from each other by partitions. For the sake of clarity, FIG. 2 only shows 16 sectors, but this number may be higher in practice, for example 30. In conventional manner, which does not need to be described in more detail, the drum exterior surface between the partitions is provided with grids across which a filter cloth is stretched. This filter cloth can be held in its place at the partitions.

At the front or leading edge of each sector, in the rotational sense, a set of conduits in the form of pipes 11 is fitted to the inside of the drum wall and communicate with the drum exterior. These pipes 11 join together into a single pipe which extends into the pipe plate 4. In a similar way, another set of pipes 12 are connected to the drum exterior surface at the rear or trailing edge of each sector and join together to run into the pipe plate 4. The pipes 11 and 12 from all the sectors form separate groups, which are respectively connected to two rings of apertures 19 and 20 in the pipe plate 4. According to the invention a third series of pipes 13 is provided for each sector, and the group formed by the pipes 13 are connected to a ring of apertures 21 in the pipe plate 4. These apertures 21 are slot-shaped with their longitudinal direction extending radially. The three rings of apertures 19, 20 and 21 are thus of different radii.

Above the drum 2 a number of pipes 14 extending longitudinally are fitted within the casing 1, these pipes being provided with spray holes, from which additional solvent for lubricant can be sprayed onto the filter cake in order to wash out any residual oil components.

A mixture of lubricant, methyl-ethyl ketone as solvent and wax in the lubricant (this wax mainly consisting of paraffin components) is conveyed into the bottom part of the casing 1 for filtration via an inlet hole 17. The level of the liquid within the apparatus is kept constant. On cooling of the liquid to a temperature between $-10°$ C. and $-30°$ C. the wax crystallizes out, while the oil within the solution remains in a thin fluid state.

During the rotation of the drum 2 a filter cake is gradually deposited on the drum surface, and is removed on the right-hand side (FIG. 1) by a scraper 15. A discharge screw 16 then removes the wax from the apparatus.

By means of the apertures in the valve members 4 and 7 the connections for vacuum and pressurized gas 9 and 10 are arranged in such a way that the holes 19,20 and 21 and thus the sectors of the drum are shut off or are in an open connection with the vacuum or pressurized gas source according to a predetermined programme.

Figure 3A:
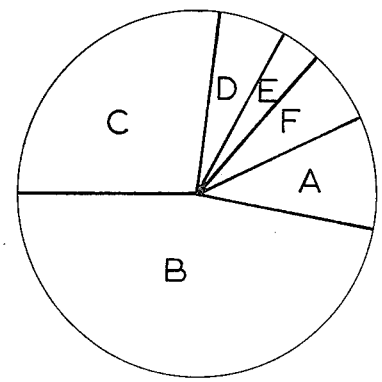
FIG. 3a is a schematic switching diagram of a vacuum filter, as known in the art.

FIG. 3a shows this programme schematically for a single sector, over one rotation of the drum, for an equivalent prior art arrangement which lacked the pipes 13 and apertures 21. Over the angle A, the pipes are all shut off from the vacuum as well as from the pressurized gas. Subsequently vacuum is admitted from the angle B and is maintained over the angle C. The filter cake is also washed over the angle C with a dilute solvent, in order to rinse all oil-residues out of the wax cake. Over the succeeding angle D the vacuum is further maintained, either in combination with rinsing with concentrated solvent or without any solvent. In the latter case the cake is dried intensively.

Pressurized gas is admitted beneath the filter cloth via the pipes 11,12 over an angle F, causing the cake to be blown off the filter cloth. In order to prevent the solvent and oil residues from being blown out of the pipes 11 and 12 back into the cake, the opportunity is given over the angle E for the liquid contained in the pipes to escape by connecting the pipes 12 to low over-pressure and keeping the front pipes 11 connected to vacuum. This is the purging step.

Figure 3B:
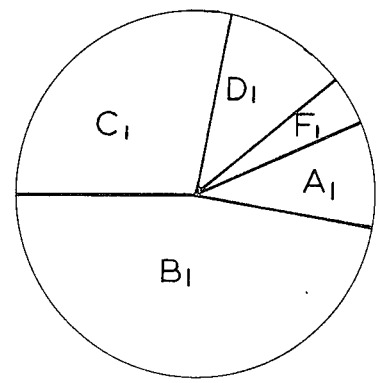
FIG. 3b is a typical switching diagram of the filter of the invention shown in FIG. 1.

FIG. 3b shows the programme which is preferred with the new construction afforded by the invention. Over the angles $B_1$, $C_1$ and $D_1$ the pipes 11 and 12 are in open communication with the vacuum pipe 9 via the apertures 19 and 20. The apertures 19 and 20 are then closed, and pressurized gas is applied to the apertures 21. Any liquid left in the pipes 11 and 12 can now no longer enter the filter cake because these pipes are connected to the pressurized gas connection.

Figure 4:
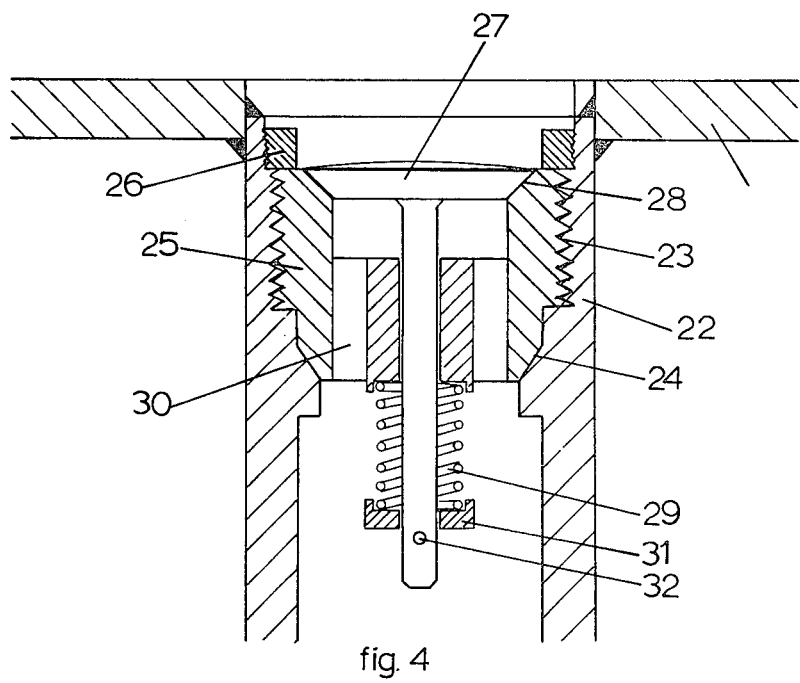
FIG. 4 is a sectional view of a one-way valve used in the filter of FIG. 1.

In the ends of the pipes 13 near the connection to the drum wall 2, one-way valves are fitted. In FIG. 4 a first embodiment of this valve is illustrated. The end 22 of the pipe 13 is welded to the drum wall 2 and has a screw-threaded chamber 23 with a seat 24. A plastics valve body 25 fits into the chamber 23 and seals on the seat 24. This body 25 is fastened tightly in the chamber 23 by means of a ring 26. In the body a valve member 27 is movable longitudinally up against a valve seat 28. By means of a compression spring 29, a washer 31 and a lock-pin 32, the valve 27 is kept pressed to valve seat 28 with just a slight pre-pressure. In this closed position, the spring 29 is about slack.

Figure 5:
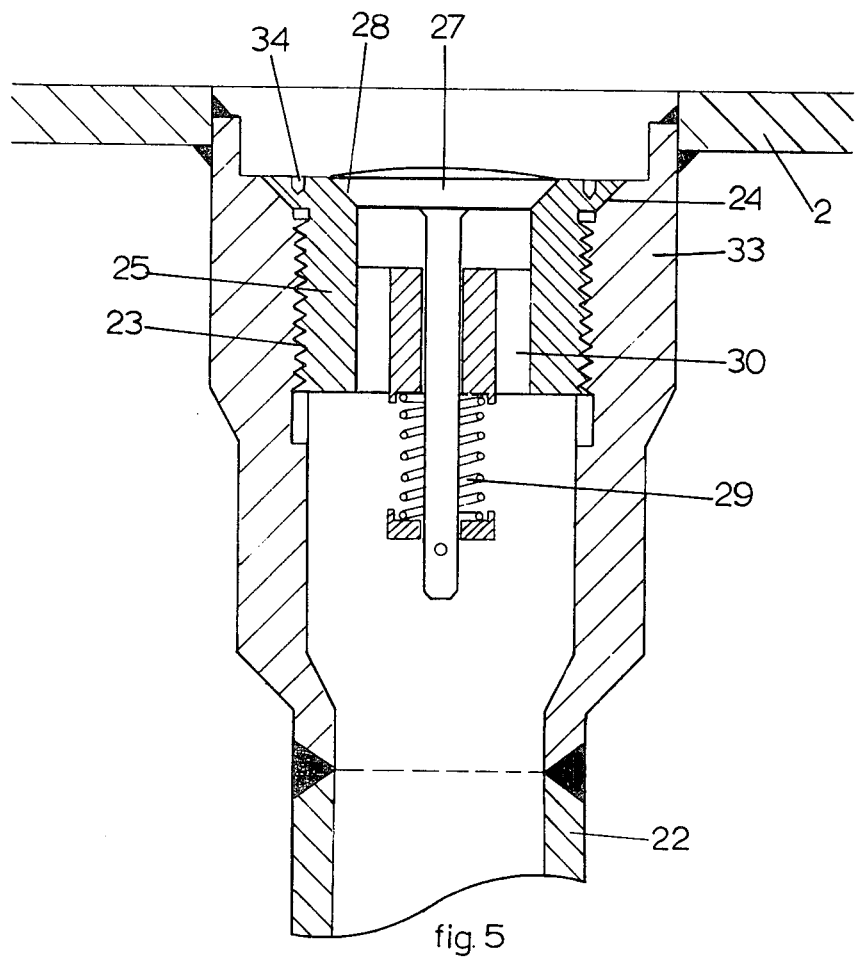
FIG. 5 is a sectional view of another such valve which can be used in the invention.

FIG. 5 shows a modification of this one-way valve. Instead of the pipe end 22 itself being welded to drum wall 2, a transition piece 33 is welded to the pipe end and is in its turn welded to the drum wall 2. In this way it is unnecessary to provide the end 22 of the pipe with a special profile. The plastics body 25 is screw-threaded and is screwed into the threaded chamber 23 in the transition piece 33. For this purpose the head surface of the body 25 is provided with holes 34 into which a special auxiliary tool can be inserted to tighten it. The seat 24 between the body 25 and auxiliary pipe 33 is near the outer end of the transition piece 33. Otherwise this embodiment is in principal not dissimilar to that of FIG. 4. By keeping the pipes 13 connected to vacuum when the drum sector is being rotated through the angles $B_1$, $C_1$ and $D_1$, the shutting force of the spring 29 is reinforced. During this whole movement of the drum no liquid can penetrate into the pipes 13. When the sector of the circumference of the drum enters into angle $F_1$, the pipes 13 are connected to the pressurized gas pipe 10, so that the one-way valves can open very simply and quickly and the gas can enter into the sector concerned beneath the filter cloth. Because of the greater effectiveness of this blowing-off than is possible in the conventional constructions, it is now possible to omit altogether the angle E and to make the angle $F_1$ smaller than F in FIG. 3a. It is important, however, that the pressure under the filter cake can be built up and reduced again as fast as possible. To this end the apertures 21 are slot-shaped as described above, as are the opposed apertures in the valve body 7.

Figure 6:
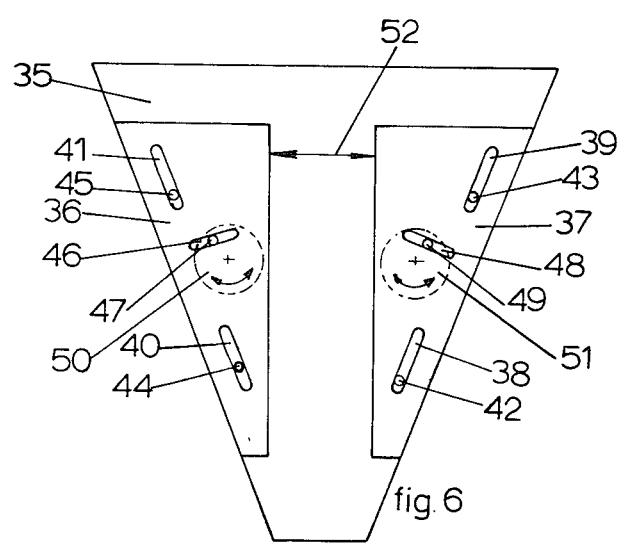
FIG. 6 shows schematically the construction of an adjustable slot in the fixed valve member.

FIG. 6 shows how one of these slots 52 in the valve body 7 can be made adjustable. At the location of the slot 52, there is a recess 35 in the axial end face of the valve body, in which two wedge-shaped plates 36 and 37 are movable in the direction of the arrow on fixed pins 42, 43, 44, 45 projecting into slots 38, 39, 40, 41. In two other slots 46 and 48, pins 47 and 49 of eccentrics 50 and 51 fit. On rotation of the eccentrics the plate-shaped wedges 36 and 37 are caused to move longitudinally, causing the slot 52 to change both width and location. By rotating the eccentrics 50 and 51 simultaneously in opposite directions, the plate-shaped wedges 36 and 37 move simultaneously either upwards or downwards, so that the slot 52 is widened or narrowed. By rotating the eccentrics 50 and 51 in different directions it is at the same time possible to move the slot 52 more to the left or to the right. In this manner it is possible to vary the moment of blowing and its duration, viz. to widen or narrow the angle $F_1$ in FIG. 3b, or to shift it forwards or backwards. Consequently, it is possible to adapt the working of the vacuum filter to different practical conditions.

What is claimed is:
1. Rotary drum vacuum filter, comprising
   (a) a hollow drum having a cylindrical drum wall, end walls, and a drum axis and rotatable about the drum axis, the cylindrical drum wall, which in use supports filter material, being divided into a plurality of axially extending sectors,
   (b) a rotary valve member mounted on an end wall on the axis for rotation with the drum and having an axial face with a plurality of apertures divided in groups arranged respectively at different radial distances from the drum axis,
   (c) a fixed valve member having an axial face axially opposed to said axial face of the rotary valve member and having apertures coincidable with said apertures of said rotary valve member, said fixed valve member having connectors communicating with said orifices for connecting to sources of vacuum and pressurized gas,
   (d) a plurality of conduits for each said sector of the drum wall mounted within said drum, connecting the said sectors to the said apertures of the rotary valve member so that, when the drum rotates, the rotary and fixed valve members act, by relative movement of their said apertures, to switch the respective sectors successively through a predetermined programme of connections to said vacuum and pressurized gas sources, the said conduits of the sectors being divided into a plurality of groups with all the conduits of a group being connected to one orifice of the rotary valve member and having the same function in relation to their respective associated sectors,
   (e) the conduits of a first one of said groups of conduits each having, at its end and flush with the fluid collecting surface interiorly of the drum, a one-way valve which if closed prevents liquid from being collected by an otherwise open-ended conduit and then blown back into the filter with subsequent air discharge by the conduit.

2. The filter according to claim 1 wherein the said conduits, other than the conduits of said first group, are connectible by said rotary and fixed valve members only to said vacuum source.

3. The filter according to claim 1 wherein the said apertures, associated with the conduits of the said first group of conduits, in at least one of the rotary valve member and fixed valve member are slot-shaped, with the longitudinal direction of their slot-shape extending radially.

4. The filter according to claim 3 wherein the said slot-shape of the apertures is adjustable as to at least one of location and width.

5. The filter according to one of claims 1, 2 or 3, wherein each one-way valve includes a spring urging said valve towards its closed position, said spring being slack in the closed position of the valve, and the said conduits of the first group are connected by the rotary and fixed valve members to the vacuum source, when they are not connected to the source of pressurized gas.

6. The filter according to one of claims 1, 2 or 3 wherein the one-way valves are each separately removable and insertable as a unit from the exterior of the drum.

7. The filter according to one of claims 1, 2 or 3 which is part of apparatus which is coolable, including a casing enveloping the drum, and the apparatus being adapted for filtering paraffin components from a mixture of mineral oil and solvents.

* * * * *